United States Patent [19]

Chen

[11] Patent Number: 6,035,271
[45] Date of Patent: Mar. 7, 2000

[54] STATISTICAL METHODS AND APPARATUS FOR PITCH EXTRACTION IN SPEECH RECOGNITION, SYNTHESIS AND REGENERATION

[75] Inventor: Chengjun Julian Chen, White Plains, N.Y.

[73] Assignee: International Business Machines Corporation, Armonk, N.Y.

[21] Appl. No.: 08/961,733

[22] Filed: Oct. 31, 1997

Related U.S. Application Data

[63] Continuation-in-part of application No. 08/404,786, Mar. 15, 1995.

[51] Int. Cl.[7] .................................................. G10L 3/00
[52] U.S. Cl. ........................ 704/207; 704/217; 704/216
[58] Field of Search ................................... 704/207, 216, 704/217, 218, 237, 263

[56] References Cited

U.S. PATENT DOCUMENTS

| | | | |
|---|---|---|---|
| 3,069,507 | 12/1962 | David | 704/217 |
| 4,461,024 | 7/1984 | Rengger et al. | 704/233 |
| 4,561,102 | 12/1985 | Prezas | 704/207 |
| 4,653,098 | 3/1987 | Nakata et al. | 704/207 |
| 5,353,372 | 10/1994 | Cook et al. | 704/207 |

OTHER PUBLICATIONS

Sadaoki Furui, (Digital Speech Processing, Synthesis, and Recognition), pp. 103–109, Jan. 1989.

Man Mohan Sondhi, IEEE transactions on audio and electroacoustics, vol. AU–16, No. 2, pp. 262–266, Jul. 1968.

*Primary Examiner*—David R. Hudspeth
*Assistant Examiner*—Abul K. Azad
*Attorney, Agent, or Firm*—F. Chau & Associates, LLP

[57] ABSTRACT

A method and apparatus for extracting pitch value information from speech. The method selects at least three highest peaks from a normalized autocorrelation function and produces a plurality of frequency candidates for pitch value determination. The plurality of frequency candidates are used to identify anchor points in pitch values, and is further used to perform both forward and backward searching when an anchor point cannot be readily identified. The running mean or average of determined pitch values is maintained and used in conjunction with the identified valid pitch values in a final determination of the pitch estimation using a weighted least squares fit for identified non-valid frames.

11 Claims, 9 Drawing Sheets

STATISTICAL METHODS AND APPARATUS FOR PITCH EXTRACTION IN SPEECH RECOGNITION, SYNTHESIS AND REGENERATION

RELATED APPLICATIONS

This application is a Continuation-in-Part of U.S. patent application Ser. No. 08/404,786 filed on March 15, 1995, the entire disclosure of which is incorporated herein by reference.

BACKGROUND OF THE INVENTION

The present invention relates to speech processing and, more particularly, to a statistical method and apparatus for performing pitch extraction in speech recognition, synthesis and regeneration.

It is known that pitch extraction has been an essential part of speech signal processing for decades. Typically, pitch extraction is used in three fields: speech regeneration, text-to-speech synthesis and speech recognition. In speech regeneration, pitch is an essential element in regenerating pleasant sounding speech. In text-to-speech synthesis, pitch is currently generated by discrete rules, for instance, which syllables are high pitch or low pitch. It is also known that pitch may be synthesized from text by statistical methods using the pitch data from real speech to create a database containing correlations between pitch contour and text. In speech recognition, particularly for tonal languages such as those belonging to the Sino-Tibetan stock of languages, pitch is a necessity. For non-tonal languages, a good pitch parameter may improve recognition accuracy and speed.

In spite of the intensive studies in the last decades, a totally reliable pitch extraction method is still lacking. The reasons for such deficiency in pitch extraction methods is substantially due to at least two reasons. The first is due to the conventional definition of pitch, while the second is due to the deterministic conventional method of pitch extraction. Traditionally, pitch is defined as the fundamental frequency of the voiced sections of a speech signal. This very definition causes problems. First, the distinction between voiced and unvoiced (i.e., whispered) sections of speech is not black and white (i.e., discrete). There are always transitions between a typical voiced section and a typical unvoiced section. That is, there are different degrees of clarity between such sections. Second, since speech is not a periodic phenomenon, the concept of fundamental frequency is not valid in the original sense.

Based on the above definition, the usual method of pitch determination is: (a) separate the silence from the speech signal; (b) separate the voiced part and the unvoiced part of the speech signal (note that the determination between voiced and unvoiced sections of the speech is usually treated as a yes-or-no question, that is, a frame of speech must be labelled either as voiced or unvoiced and only for the voiced frames are pitch extraction procedures applied); and (c) extract the pitch from a section of the voiced speech signal as if it is a periodic phenomenon. Three methods are typically used for pitch extraction: autocorrelation, cepstrum, and subharmonic summation, See, for example, Wolfgang J. Hess, *"Pitch and Voicing Determination"*, in *"Advances in Speech Signal Processing"*, edited by Sadaoki Furui and M., Mohan Sondhi, Marcel Dekker, Inc., New York, 1991, pp 3–48; Wolfgang J. Hess, "Pitch Determination of Speech Signals Algorithms and Devices" Springer-Verlag, Berlin, 1983; and L. R. Rabiner and R. W. Schafer, "Digital Processing of Speech Signals". For example, using the autocorrelation method, the most prominent peak is identified with pitch. However, in many cases, the peak is at frequencies other than the expected pitch. In fact, if a signal contains sinusoidal components of fundamental frequency $f_0$ and its harmonics $nf_0$, where n is an integer, then the peaks in the autocorrelation function can be at all of the following times:

$$T = \frac{n}{mf_0} \tag{1}$$

where m is another integer. Other methods have the same problem. Thus, the pitch values obtained by conventional methods are not substantially accurate. For the three speech applications mentioned above (i.e., speech recognition, synthesis and regeneration), a continuous and accurate pitch curve is required. However, none of the conventional methods described above satisfactorily meet such requirements.

It is observed that even by whispering, the tones of tonal languages, e.g., Mandarin Chinese, can be recognized by the human ear. For non-tonal languages, the prosodic pitch contour can also be expressed and perceived. Also, it is to be appreciated that for speech recognition, the derivative of pitch is as important as the absolute value of pitch. At the boundaries of voiced speech (assuming the boundaries are defined properly) and unvoiced speech, continuity must be preserved. Thus, it would be highly desirable and advantageous to define a pitch which exists at all times, not only during voiced portions of speech.

SUMMARY OF THE INVENTION

It is therefore an object of the present invention to provide a method for determining the pitch as a continuous variable using statistical methods.

Yet another object of the invention is to provide a method for determining the pitch as a continuous variable by considering the acoustic evidences including those of the past history (e. g., up to 0.1 seconds before the moment of pitch determination), and those of the future (e. g., up to 0.1 seconds after the moment of pitch determination.

In one embodiment of the invention, the speech waveform is received and digitized as in conventional speech recognition systems. An autocorrelation function is then computed on the digitized speech. The peaks in the autocorrelation function are considered. At least three of the highest peaks are selected and ranked. Using the selected peaks, a plurality of frequency candidates are calculated. A determination is then made as to whether any of the plurality of frequency candidates is an anchor point (i.e., is substantially 100% accurate in identifying pitch value). If an anchor point is determined, it is identified as a valid pitch value. If an anchor point is not determined to be present, a determination is made as to whether the previous frame was valid. If the previous frame was valid, a forward search of the plurality of frequency candidates is performed. If the forward search results in the identification of a valid pitch value, it is identified as such. When the previous frame was not valid, or the forward search does not reveal a valid pitch value, the frame is identified as a left over frame.

When a frame is determined to be an anchor point, and is identified as a valid pitch value, another determination as to whether any previous frames are left over is made. If no previous frames are left over, not action is taken. If there is a previous frame left over, a backward search of the plurality of frequency candidates is performed. When the backward search results in an identification of a valid pitch value, it is identified as such, and when no valid pitch value is obtained from the backward search, that frame is identified as a non-valid frame.

A plurality of raw pitch values, including those from valid frames and non-valid frames, are then processed through a weighted dynamic least square fit to estimate the pitch value. The weighted dynamic least squares fits uses the valid raw pitch value data previously determined, and the running mean of the valid pitch data to perform the pitch estimation. During the entire process, the running mean or average of the pitch value is calculated, and updated as the results of the process are produced.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
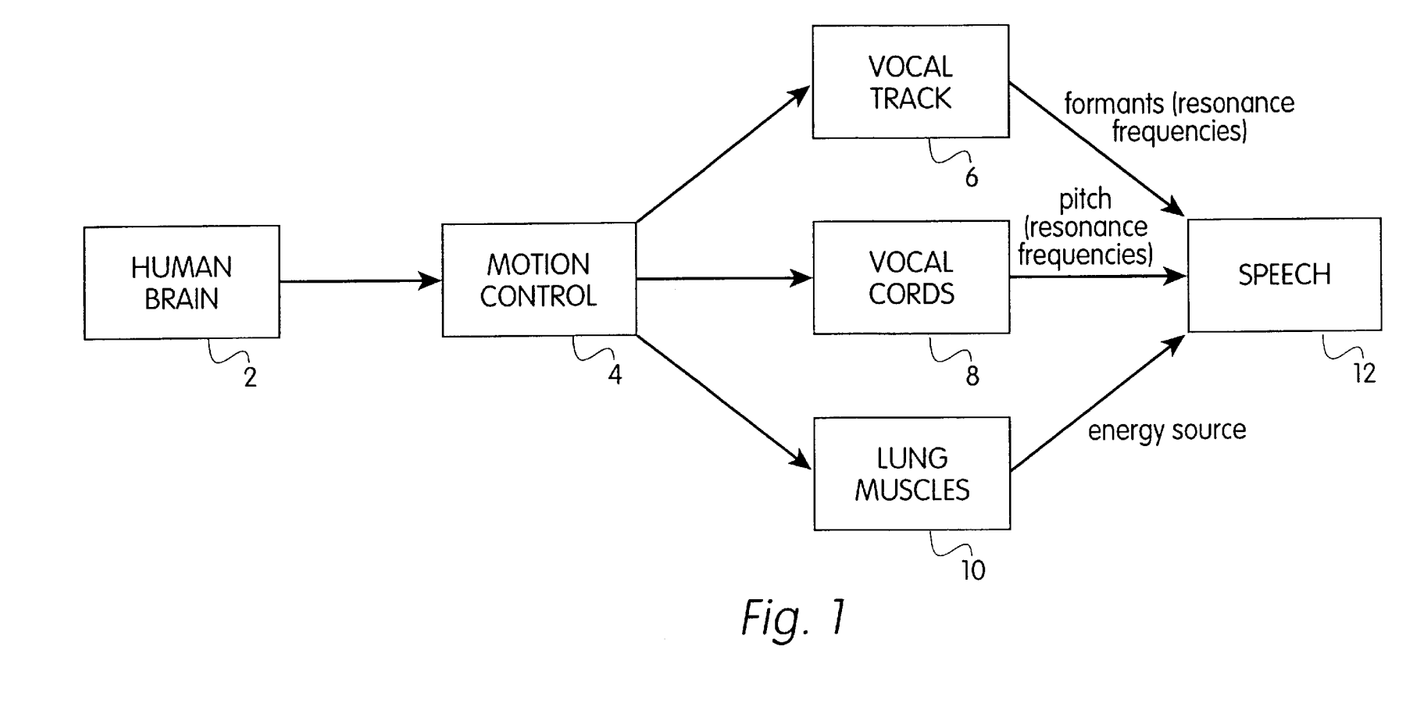
FIG. 1 is a block diagram illustrating human pitch generation.

In order to provide a better understanding of the concepts taught by the present invention, the process of human speech generation and perception is described below in the context of FIG. 1. First, some text to be spoken is conceived in the brain 2 of a speaker. The brain then translates the text into a series of muscle motions through muscle control 4. For example, some muscles change the shape of the vocal track 6 thus changing a resonance frequency associated with the vocal track. Accordingly, when a flow of air comes from the lungs (lung muscle 10), the formants of the speech are formed. Further, some muscle motions are for changing the pitch. A physical phenomenon related to pitch is the resonance frequency of the vocal cords. By generating an air flow (lung muscle 10) to pass through the vocal cords 8, a voiced section of speech (speech 12) is generated.

However, it is important to understand that even if there is no air flow, such as with unvoiced speech, a resonance frequency is still associated with the vocal cords. For example, by speaking two consecutive vowels with a consonant or a pause in between, first with a high pitch and then with a low pitch, the muscles change the resonance frequency of the vocal cords continuously upwards during the time of the speaking of the consonant or the pause.

Thus, in accordance with the preset invention, pitch is defined as the resonance frequency of the vocal cords at any moment, similar to the resonance frequencies of the vocal track which determines the formats. According to this definition of pitch, the process of pitch extraction according to the invention is a decoding process utilizing acoustic signals in the form of unprocessed and/or pre-processed data. Thus, the rigid separation of voiced sections and unvoiced sections according to conventional pitch extraction techniques is not required.

There are many possible methods to preprocess speech for pitch decoding according to the invention. A convenient and preferred method is to employ the autocorrelation function over a short time duration, for example, 20 milliseconds. Typical short-time autocorrelation functions are shown in FIGS. 2a through 2e.

Figure 2A:
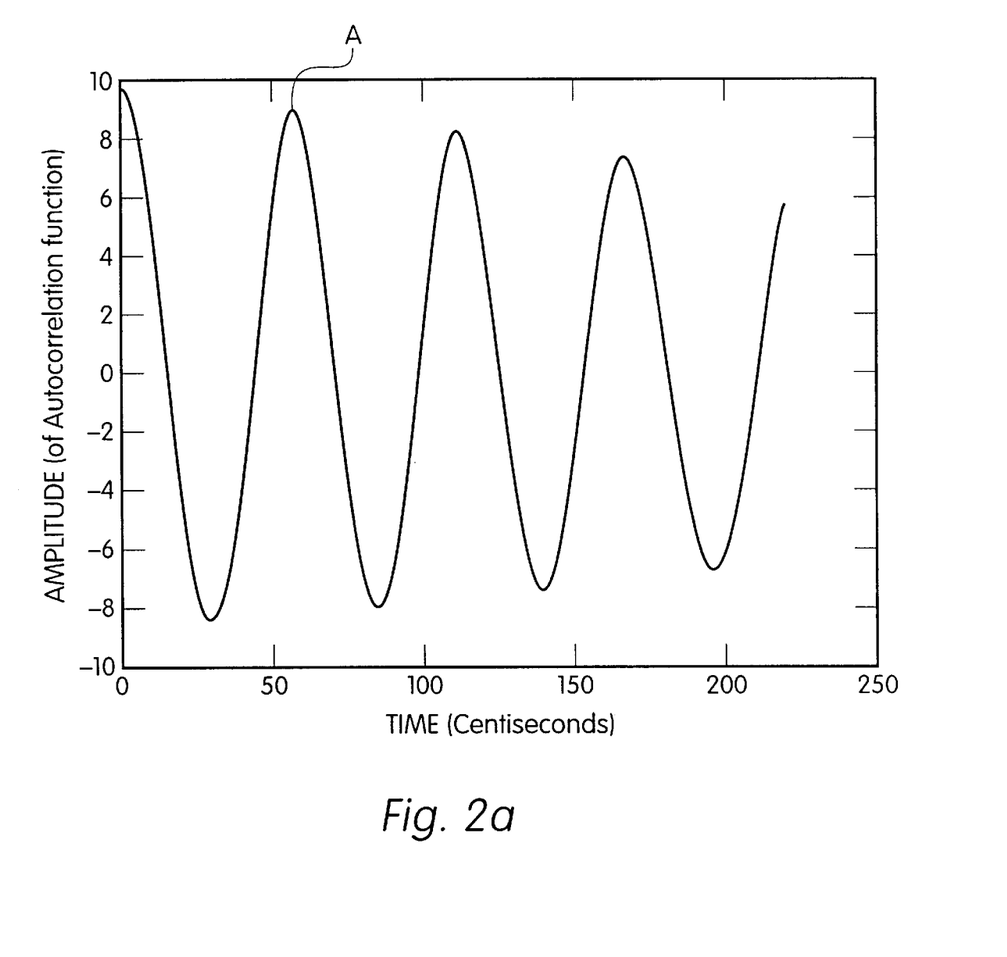
FIGS. 2A through 2E are graphs of amplitude versus time of exemplary short-time autocorrelation functions of the speech signal.
Figure 2B:
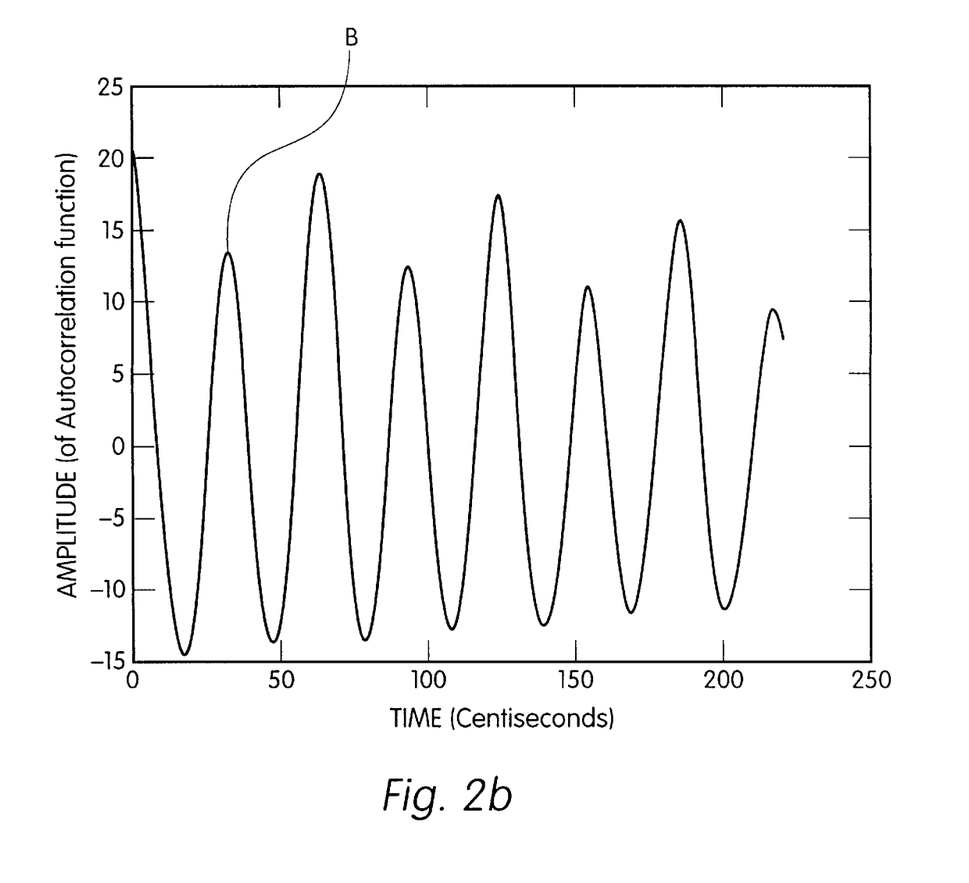
Figure 2C:
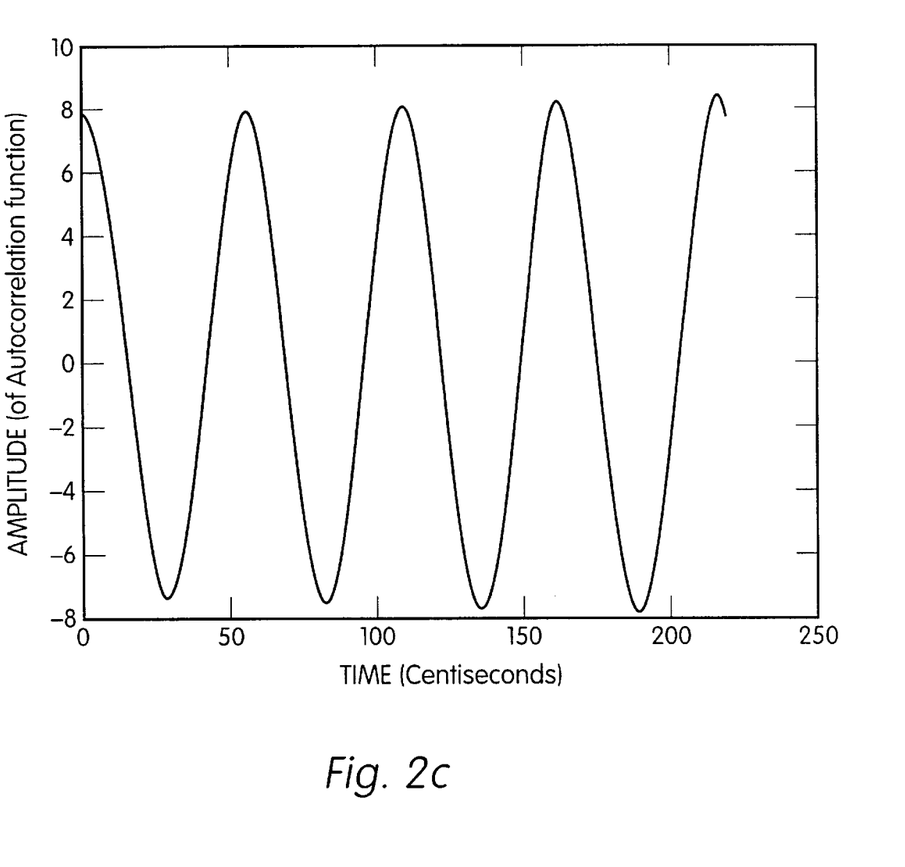
Figure 2D:
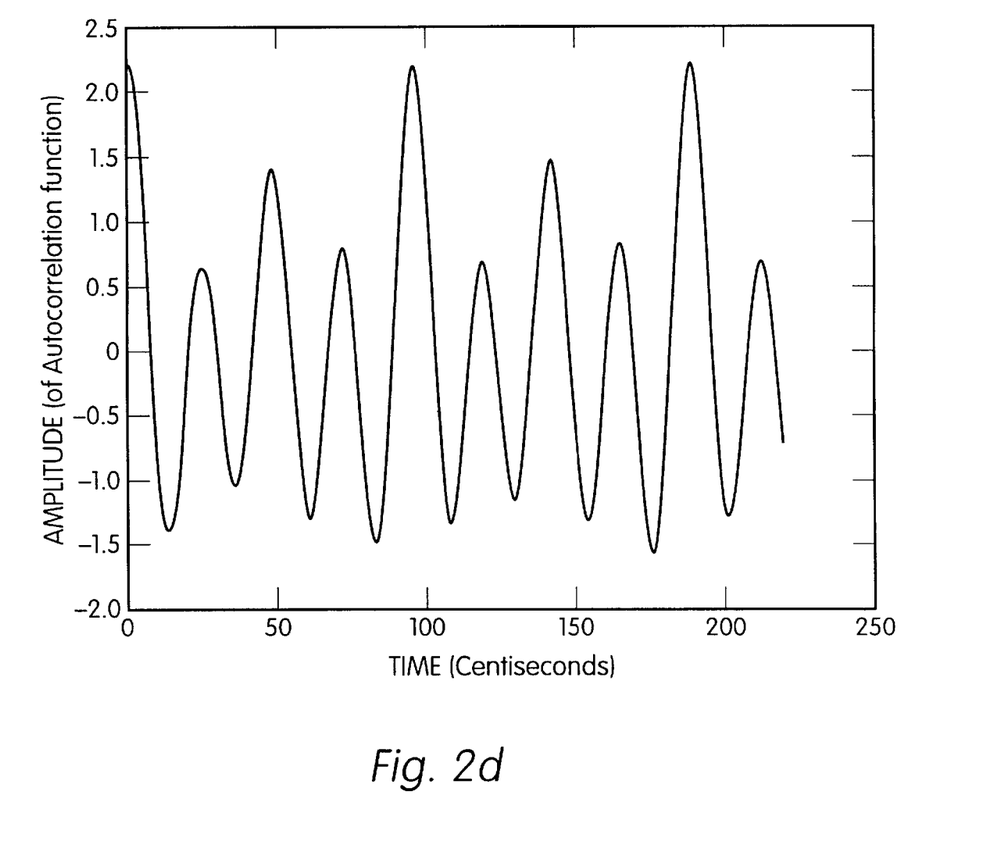
Figure 2E:
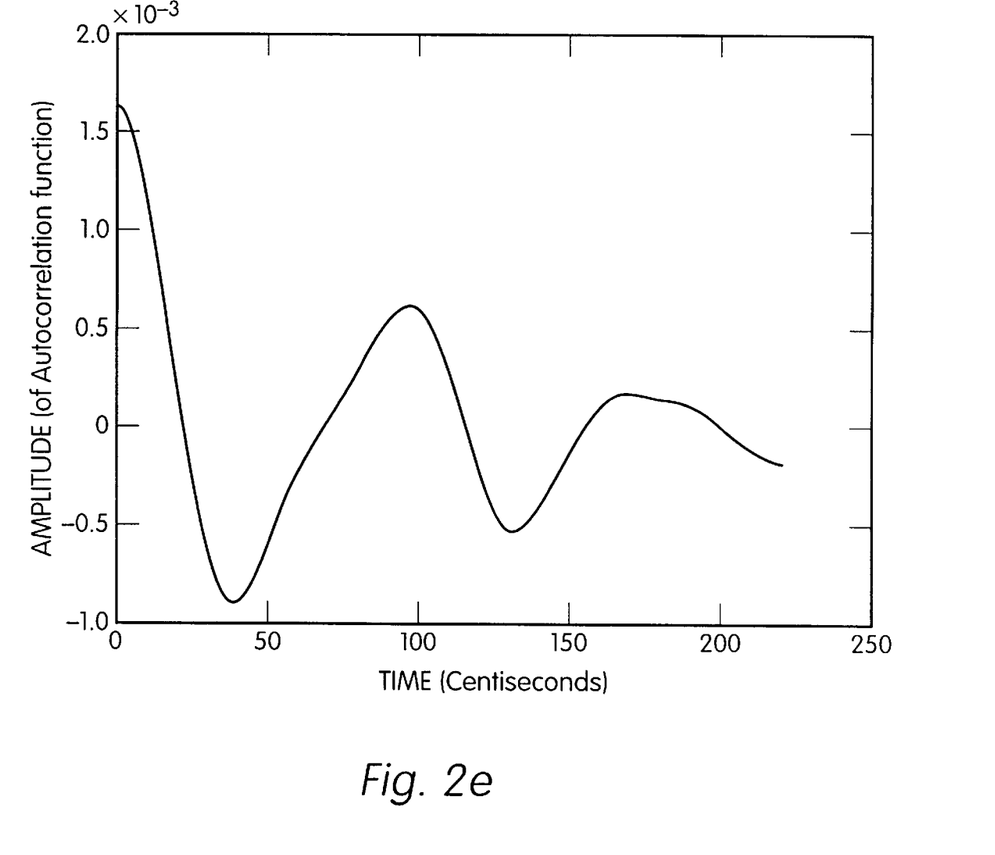

As shown in FIG. 2a, the autocorrelation function of a nearly sinusoidal signal is a nearly sinusoidal function with a series of equally spaced peaks of similar peak values. The first peak, labelled A, with n=1 and m=1 wherein n and m are integers, corresponds to the inverse of pitch. However, choosing the first peak as the pitch is not necessarily the correct choice. In FIG. 2b, the autocorrelation function exhibits a weaker peak, labelled B, between the first primary peak and the origin. While choosing the first primary peak may appear to be the optimal choice, very often, the second and third primary peaks are even higher than the first primary peak, as shown in FIG. 2c. In some cases, the autocorrelation function exhibits multiple peaks, as shown in FIG. 2d, making the choice even more difficult. Still further, it is interesting to note that sometimes a very weak signal, usually characterized as silence or at least unvoiced sound, provides adequate information about the pitch, as shown in FIG. 2e.

Since it is now evident, based on the above-described possibilities, that the collection of all peaks in the autocorrelation function provides sufficient evidence for the true value of the pitch, the present invention preferably provides a method and apparatus for determining the most probable values of pitch based on evidence (acoustic signals) provided by the set of multiple peaks in the autocorrelation function.

Decoding Process to Find the Pitch

Physiological Constraints

As mentioned, in accordance with the present invention, pitch is a physiological phenomenon. However, there are several physiological constraints to be applied to the decoding process according to the invention, as will be explained. Such constraints are:

1. Pitch at rest. When a person tries to utter a voice of very high pitch or very low pitch, some muscles are typically stressed. If all the muscles are relaxed, the pitch of a soft voice is of an average pitch, which may be obtained as the average value of pitches of several utterances.

2. Continuity condition. The change of the resonance frequency of the vocal cords requires motions of muscles and, as a result, is not instantaneous. Therefore, the rate of pitch change may be bounded by a finite number. There are two quantities involved with the rate of pitch change: (a) maximum jump from the average value, for example, approximately $\sqrt{3}$; and (b) maximum shift by one frame (about 0.01 second), for example, about 0.002 of the logarithm (base 10).

Normalized Autocorrelation Function

First, the speech signal is sampled at a sampling rate, for example, 11000 times a second of accuracy 16 bit (−32767 to +32768). Then, the speech signal is a series of integer values with an index n, denoted as val(n). To make an autocorrelation function, we define a window of N points. For example, if the window width is 0.02 seconds, then N=220. The standard definition of autocorrelation function at time m is $$cor(m) = \sum_{n=1}^{N} val(n) \, val(n+m)$$

However, the intensity of the speech signal may vary quickly with time. Thus, the most prominent peaks may shift to hither m or lower m according to the trend of intensity (amplitude).

One reason the autocorrelation function gives false peaks is the variation of amplitude (loudness) of the voice signal. Thus, in accordance with the present invention, the autocorrelation function is normalized with respect to amplitude by a quadratic function with respect to the sums associated with the autocorrelation function.

In order to compensate the intensity variation, we calculate the energy of the instantaneous voice at the beginning (n=0), middle (n=N/2), and the ending (n=N) of the window, denoted by $E_0$, $E_1$, and $E_2$, respectively.

$$E_0 = \sum_{n=1}^{N} val(n) \times val(n), \quad (3)$$

$$E_1 = \sum_{n=1}^{N} val\left(n + \frac{N}{2}\right) \times val\left(n + \frac{N}{2}\right), \quad (4)$$

$$E_2 = \sum_{n=1}^{N} val(n+N) \times val(n+N), \quad (5)$$

where $E_0$, $E_1$, $E_2$ are intervals of the autocorrelation function and N is the number of frames in centiseconeds in the autocorrelation. By fitting the inverse of energy variation with a quadratic fuhncdtion of m, $am^2+bm+c$, we find the relation between the three quadratic coefficients a, b, and c and the energy values $E_0$, $E_1$, and $E_2$ as follows:

$$a = \frac{1}{2\sqrt{E_2 E_0}} + \frac{1}{2E_0} - \frac{1}{\sqrt{E_1 E_0}}, \quad (6)$$

and $$b = \frac{2}{\sqrt{E_1 E_0}} - \frac{1}{2\sqrt{E_2 E_0}} - \frac{3}{2E_0}, \quad (7)$$

Accordingly, the normalized autocorrelation function is defined as:

$$c = \frac{1}{E_0} \quad (8)$$

$$cor(m) = (am^2 + bm + c)\sum_{n=1}^{N} val(n) \times val(n+m). \quad (9)$$

Again, n and m represent integer values of the indices of the digitized speech signal.

Treatment of Autocorrelation Data

To obtain a complete but compressed set of data from the normalized autocorrelation function, at least the three highest peaks from the function are preferably selected. Thus, for each frame (e.g., each 10 milliseconds), three top-ranked frequencies are provided, calculated from the peaks using quadratic fitting. Thus, if:

$$cor(n-1) < cor(n) \quad (10)$$

and $$cor(n+1) < cor(n), \quad (11)$$

the logarithm of the peak frequency may be represented as:

$$P = \log_{10}\left(n + \frac{cor(n+1) - cor(n-1)}{2cor(n) - cor(n+1) - cor(n-1)}\right) \quad (12)$$

In the following discussions, P(0) represents the position of the first peak, P(1) represents the position of the second peak and P(2) represents the position of the third peak. Together with the energy $E_0$, there are identified four parameters per frame which serve as the raw data for predicting the pitch.

Anchor Points

By preferably defining certain substantially strict conditions, an anchor point is defined as the pitch value predicted by the four parameters from the autocorrelation function would be approximately 100% certain. Those conditions are:

1. the energy $E_0$ exceeds a predetermined value, i.e.:

$$E_0 > E_{thres}; \quad (13)$$

2. the three peaks form a simple arithmetic series, that is, for example:

$$P(0) \approx 2P(1) \quad (14)$$

$$P(0) \approx 3P(2); \quad (15)$$

3. the difference between the logarithm of pitch and the average value of log pitch is within a jump threshold J:

$$|P(0) - P_{ave}| < J, \quad (16)$$

wherein a typical value of J is approximately 0.2385.

The average value of pitch is the running average of the valid pitch points. At the beginning of the process, $P_{ave}$ can be taken as the global averages of a large number of speakers, for example, 160 Hz or 2.20 in common logarithm. As time goes on, the average value of pitch will converge to the average pitch value of the speaker, although small variations are allowed.

It is to be appreciated that the energy threshold is not a rigid value. It is used to weed out some artifacts caused by noise. The pitch value, thus defined, is the valid value of that frame. The "true" pitch would be obtained by a weighted dynamic least-squares fitting process, as will be explained. It is to be understood that the difference between the defined pitch value and the "true" pitch is that true pitch represents a long trend of pitch (over 10 frames), using the weighted dynamic least-squares fit algorithm.

Forward Searching

If at a frame, the above conditions are not met, but the previous frame has a valid pitch value, then a possible value of log pitch is determined by a search over the following nine values (i.e., frequency candidates).

P(0), $\log_{10}(2)$+P(0), $\log_{10}(3)$+P(0),

P(1), $\log_{10}(2)$+P(1), $\log_{10}(3)$+P(1),

P(2), $\log_{10}(2)$+P(2), $\log_{10}(3)$+P(2). (17)

If any of the nine values is within the allowed difference from the previous valid pitch value (for example, the absolute value of the difference is less than approximately 0.02), it is registered as a valid frame. Accordingly, that value is the valid pitch of that frame. It is to be understood that the nine values are derived from equation (1) and, particularly, come from n and m being respectively equal to integers 1, 2 and 3. The nine values are derived using the frequencies corresponding to the three ranked peaks and their first and second harmonics. However, a greater number of values may be calculated to be searched in order to determine a possible value of logpitch. This procedure searches ahead of the frame in question using these nine values when it has been determined that the previous frame produced a valid value.

Backward Searching

If the conditions of the forward searching are not met, then the raw pitch data (three points and, thus, the nine values above) are stored for backward searching. If frame (n+1) has a valid pitch but frame n does not, then a procedure similar to the forward searching is executed to find a valid pitch value for frame n (if it exists).

Running Average

All the above-described types of valid pitch values are used to calculate the running average (mean) of the log pitch, that is, $P_{ave}$. The time constant is roughly a fraction of a second.

Non-Valid Points

If the pitch value of a frame cannot be found using the above three methods (determined as an anchor point, or obtained by forward search and backward search), then the pitch value is preferably assigned to be the running average, and a "silence weight" is assigned to it, for example, approximately 0.005.

Weighted Dynamic Least-Squares-Fit

The pitch values thus obtained are raw data points of the pitch, which includes both valid and non-valid points. A weighted dynamic least-squares-fitting process is used to estimate the pitch values which, according to the invention, are defined as the resonance frequencies of vocal cords. Here, the physiological constraints are applied. Such physiological constraints require the following conditions: (1) not only the pitch value, but also its first and second derivative, are continuous (no harsh jumps); (2) the typical time for a gross pitch change (for example, from the top to the bottom) is approximately 0.1 second.

For all valid frames/points, the value of the pitch is obtained as either an anchor point, or is determined through the forward and backward searching of the generated frequency candidates. The raw pitch value of these frames are generally smoothly connected. For points identified as non-valid (i.e., without a valid pitch value), the raw pitch is assigned as the running average/mean of the pitch value. The value of raw pitch in an interval of non-valid frames is constant.

A jump usually occurs at the border of a valid interval and a non-valid interval. The jumps indicate that the collection of raw pitch data does not represent the true pitch, since the physiological constraints do not allow sudden jumps of the resonance frequency of the vocal cords. Instead, the rate of change of the resonance frequency of the vocal cords must be finite. The following represents two potential situations:

1. To prepare for a high (low) pitch voice to appear, the skeletal muscles must gradually stretch to the high (low) position, then the vocal cords start to vibrate.
2. After a high (low) pitch voice ends, the resonance frequency gradually recovers to its relaxed position, or to prepare for another voice.

It is obvious that in order to obtain the pitch value which is the resonance frequency of the vocal cords at one point, we must know the value of raw pitch several frames ahead of time. The time constant is the typical time constant of the variation of the movement of the muscles. For example, the time can be 0.1 second (10 frames). To simulate the slow-varying process, we use the weighted dynamic least squares fitting process to estimate the pitch values, including the non-valid identified frames.

Thus, according to the invention, the pitch is estimated by a least-squares-fit to a cubic function, typically extending 10 frames. The errors to the data points are weighted. If for the valid points, the weight is about 1.0, then for the non-valid points, the weight is much smaller, for example, about 0.005. Each time a value of a frame (i.e., an initial or frontier frame) is determined, a least-squares-fit process is executed to find the value of pitch 10 frames prior to it. Thus, at a long silence, the pitch value gradually goes to its running average. If a valid point appears, then the running average quickly adapts to almost a straight line towards the valid point because of the difference in weights. If the pitch value is required to synchronize with other acoustic parameters, for example, cepstra, then the calculation of pitch should be about 10 frames ahead of time.

From this series of numbers, we are trying to determine the best series of estimated pitch P(n), and the derivative of pitch P'(n). In order to make an accurate estimation, we must wait for the raw value of the pitch M frames ahead (e.g., M=10) of time to be obtained. In other words, we start with:

$$P_{raw}(N+n), n=1, \ldots n=M$$

and $$W(N+n), n=1, \ldots n=M$$

where $P_{raw}(N+n)$ is the raw pitch values at frame N+n. For valid frames, it is the valid pitch. For non-valid frames, it is the running average. The weight W(N+n) is 1.0 for valid frames, and a smaller number such as 0.01 for non-valid frame. We calculate the pitch and derivative of pitch recursively: Starting with the values of the pitch at frame N, P(N), and the derivative of pitch at frame N, P'(N), to find P(N+1) and P'(N+1). we require that the new values satisfy a least squares fit condition to a cubic function, $$\sum_{n=1}^{M} W(N+n)[P_{raw}(N+n) - P(N) - P'(N)n - An^2 - Bn^3] = \text{Minimum}$$

To resolve the problem, we need to determine the two coefficients A and B.

First, we define the sums:

$$S_k = \sum_{n=1}^{M} W(N+n)n^k$$

Then, we calculate the following quantities:

$$Q_1 = P(N)S_2 + P'(N)S_3 - \sum_{n=1}^{M} n^2 W(N+n)P_{raw}(N+n),$$

$$Q_2 = P(N)S_2 + P'(N)S_3 - \sum_{n=1}^{M} n^3 W(N+n)P_{raw}(N+n).$$

It is easy to prove that the coefficients A and B should satisfy the following equations, $$A = \frac{Q_2 S_5 - Q_1 S_6}{S_4 S_6 - S_5^2},$$

$$B = \frac{Q_1 S_5 - Q_2 S_4}{S_4 S_6 - S_5^2},$$

The pitch and pitch derivative for frame N+1 is then

P(N+1)=P(N)+P'(N)+A+B, and

P'(N+1)=P'(N')+2A+3B.

The process goes on to determine the subsequent values of pitch and pitch derivative.

Quantization and Unit of LogPitch

A natural way to quantize logpitch is to use the music scale, especially the uniform temperament. Although the complete piano scale takes 88 keys, a 64-key scale will satisfy all speech-related applications. By defining middle-C [261.6 GHz], a 6-bit scale suffices. We name the scale Bach in view of the wohl-temperalient Klavier collection.

Experimental Results

Figure 3:
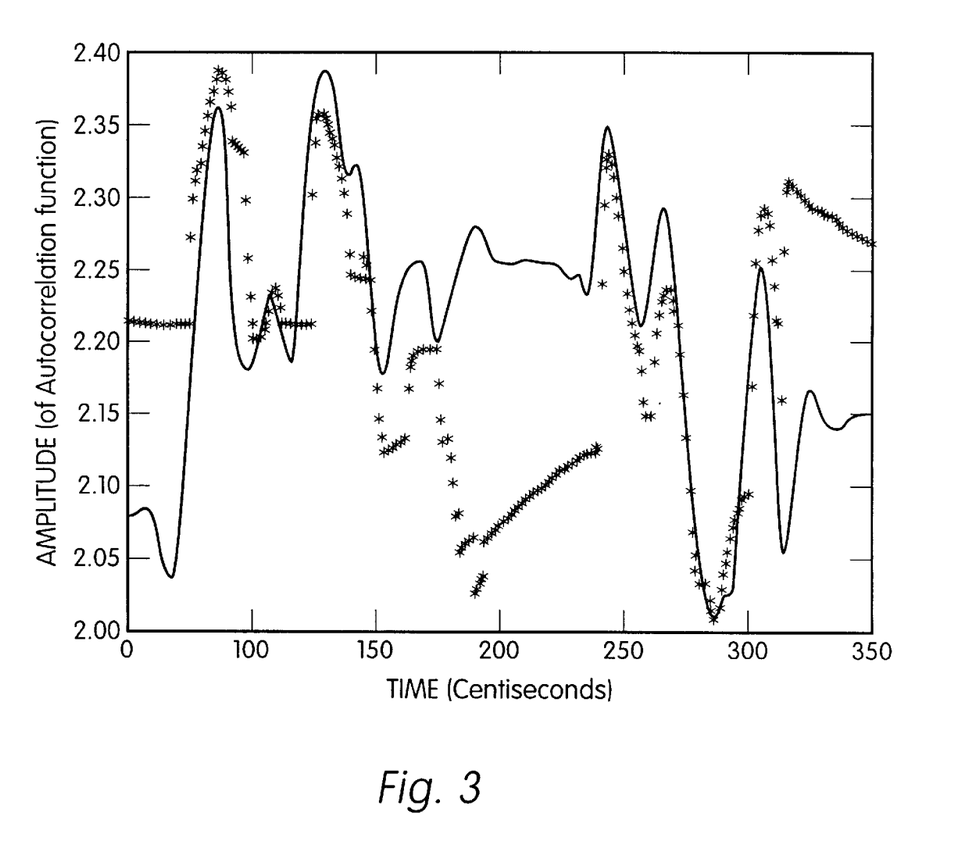
FIG. 3 is a typical pitch contour obtained using the method according to the invention.

The experiments are preferably performed with a speech recovery process. The pitch contour from the method according to the invention is shown by the solid curve in FIG. 3. The pitch values computed by logpitch (continuation from an autocorrelation-based approach) is shown by stars in FIG. 3. The recovered speech using the logpitch module shows some bumpiness, but the recovered speech using the method of the invention sounds very natural.

Figure 4:
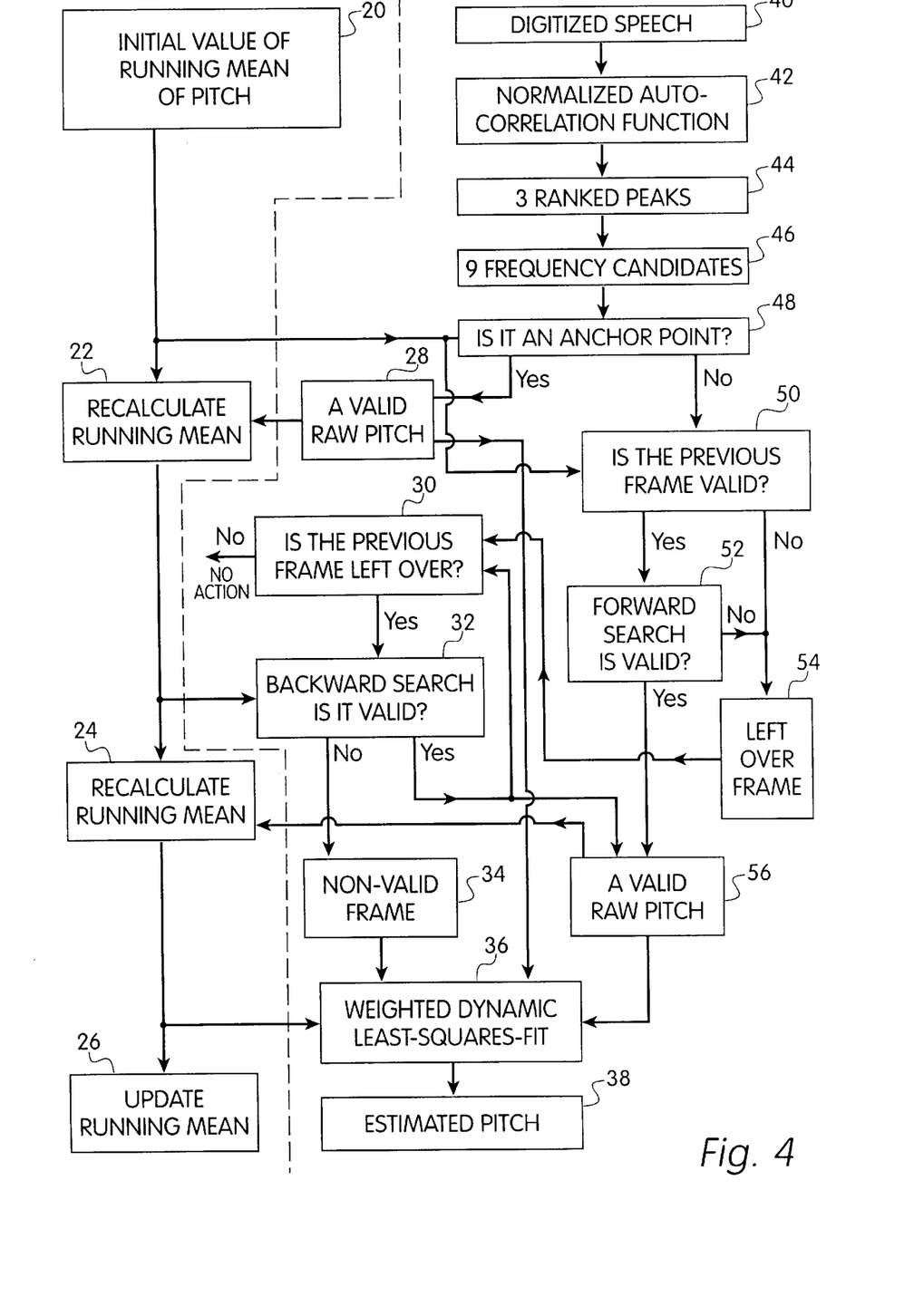
FIG. 4 is a flow chart illustrating the pitch extraction method according to an embodiment of the invention.

FIG. 4 shows a flow chart representing the pitch extraction and estimation method according to an embodiment of the invention. The left side of the flow chart (i.e. left of the dotted line) shows the computation of the running mean. The initial value of the running mean of pitch 20 is inherited from the previous computation. At each frame where there is a valid raw pitch determination, the running mean of pitch is updated or recalculated, as depicted by blocks 22 and 24. After a sentence is finished the updated running mean is stored 26 and the process transfers to the next sentence. The running mean is used to determine whether or not a frame is an anchor point 48 or a valid point 50 and 32. The running mean of the pitch is also used in the weighted dynamic least squares fit process as a filling number for non-valid frames 36.

The right side of the flowchart shows the computation process of the pitch from the speech data. The speech is first digitized 40, and a normalized autocorrelation function is calculated 42. The peaks in the autocorrelation function are ranked according to amplitude, and the first three highest peaks are retained 44. The frequencies corresponding to the three ranked peaks and their second and third harmonics are stored as frequency candidates. In this, case, this results in 9 frequency candidates 46. The frequency candidates are then evaluated using a criterion of anchor points 48. If that frame satisfies the condition of an anchor point, the frequency corresponding to the highest peak in the autocorrelation function is taken as a valid raw pitch 28. If that frame in not determined to be an anchor point, the previous frame is referred to 50. The reference back to the previous frame is made to determine if it was a valid point. If the previous frame was a valid point, then a forward search is executed 52. If one of the 9 frequency candidates satisfies the condition of the forward search, this frame is labeled as a valid point 56, and frequency is stored as a valid raw pitch. If the forward search condition is not satisfied, then the 9 frequency candidates are stored, and that frame is considered as a leftover point 54. If the frame satisfies the condition of an anchor point at step 48, and is identified as a raw valid pitch at step 28, but the previous point is not a valid point, (i.e., a left over point) 30, then a backward search is executed 32. If one of the 9 frequency candidates of that frame (i.e., a left over point) satisfies the condition of the backward search, that frequency is stored as a valid point. In this case, the prior frame is looked at again at step 30. Again, if one of its 9 frequency candidates satisfies the condition of a backward search, then that frequency is stored as a valid raw pitch, and that frame is labelled as a valid point. Otherwise, the backward search is terminated, and that frame (an all the remaining prior leftover points) are labelled as non-valid points 34. Thus, all frames have been labelled as either a valid point, having a valid raw pitch, or a non valid point, which has no valid raw pitch. In the latter case, the running mean of pitch is taken as the raw pitch value.

Thus, we have generated a sequence of a pair of numbers: a boolean number which labels a frame as either a valid point or a non-valid point; and a floating point number which is the raw pitch (either valid or the running mean). The sequence of the two numbers is then applied to the weighted dynamic least-squares-fit process 36 to generate the pitch 38.

Figure 5:
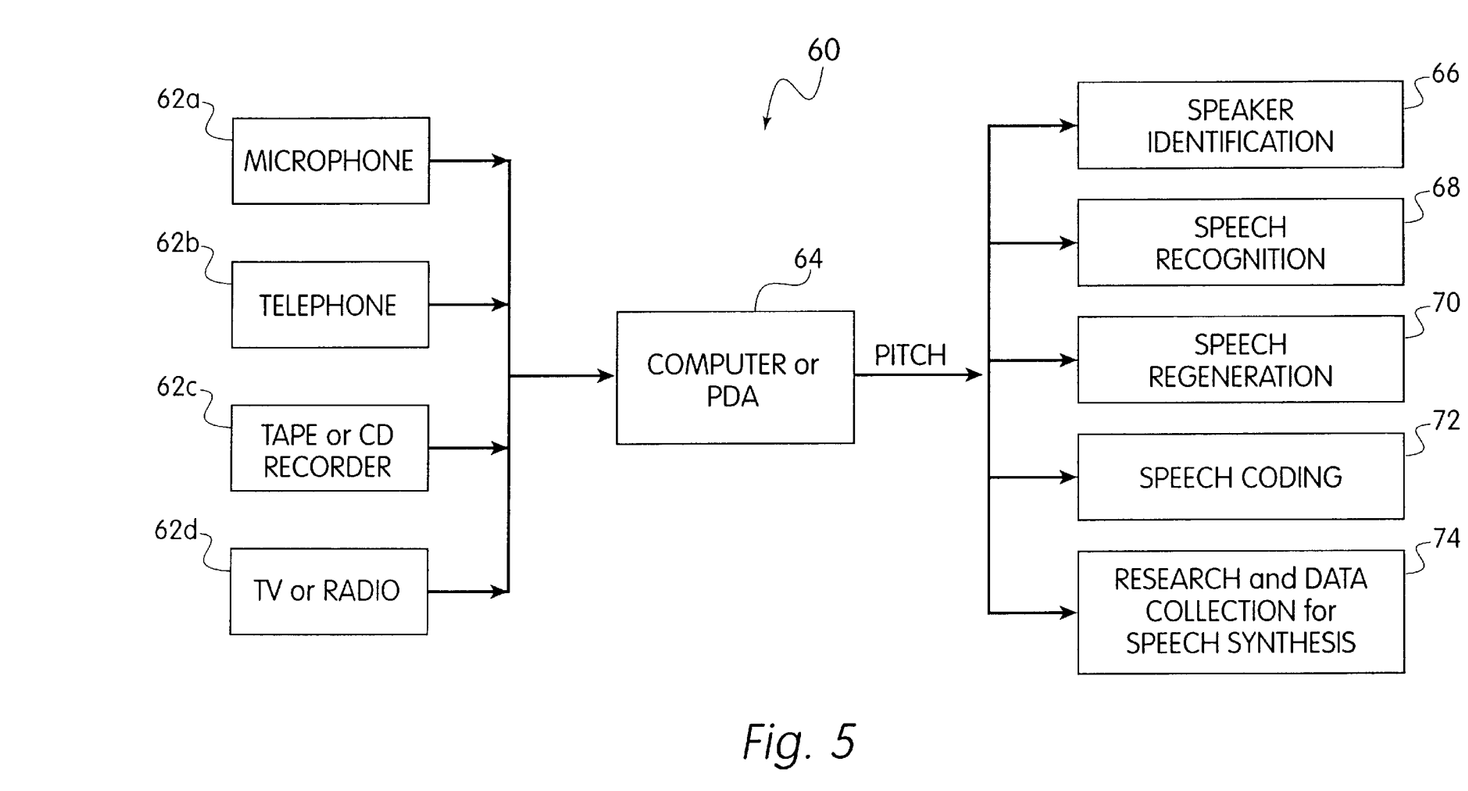
FIG. 5 is a basic block diagram illustrating the pitch extraction apparatus according to an embodiment of the invention.

FIG. 5 shows a block diagram of a pitch extraction apparatus in accordance with an embodiment of the present invention. The pitch extraction apparatus 60 can include one or more speech input devices for receiving the input speech. For example, a microphone 62*a*, telephone 62*b*, a tape or CD recorder 62*c* or a Television or radio broadcast 62*d* can be used as the speech input device. Any other suitable known input device may also be used without departing from the scope of this disclosure. Once the speech is input through an input device 62, a general purpose computer or PDA 64 receives the input speech and performs the pitch extraction in accordance with the present invention. The output of computer 64 is the extracted pitch, which results in speaker identification 66, speech recognition 68, speech regeneration 70, speech coding 72, and the research and data collection for speech synthesis 74.

General purpose computer 64 is programmed to perform the pitch extraction in accordance with the present invention, and can be a computer of any suitable known type.

Although illustrative embodiments of the present invention have been described herein with reference to the accompanying drawings, it is to be understood that the invention is not limited to those precise embodiments, and that various other changes and modifications may be affected therein by one skilled in the art without departing fiom the scope or spirit of the invention.

Commonly owned U.S. patent application Ser. No. 08/960,535 (IBM Docket No. YO997-015) filed concurrently herewith, entitled "Symbiotic Automatic Speech Recognition and Vocoder", is incorporated herein by reference.

What is claimed is:

1. A method for pitch extraction in speech recognition, synthesis and regeneration comprising the steps of:

performing autocorrelation of a digitized speech input to produce an autocorrelation function;

selecting at least the three highest peaks from the autocorrelation function;

calculating top ranked frequencies for the at least three highest peaks;

determining a plurality of frequency candidates from the calculated frequencies;

identifying valid and non-valid frames of the input speech;

determining pitch values for each frame of the received input speech using the positions of the selected peaks and an energy value representing the instantaneous voice energy;

maintaining a running average of determined pitch values; and performing a weighted dynamic least squares fit of the identified valid and non-valid frames to estimate the pitch value using a least squares fit to a cubic function.

2. The method according to claim 1, wherein said step of determining pitch values further comprises the steps of:

determining whether one of said plurality of frequency candidates is an anchor point;

identifying the frame as valid raw data when one of said plurality of frequency candidates is determined to be an anchor point;

determining whether a previous input frame of speech was identified as valid when an anchor point is not determined;

conducting a forward search of the plurality of frequency candidates when the previous frame was identified as valid;

identifying a pitch value from the forward search when such value exists; and identifying a left over frame when said steps of determining whether a previous input frame was valid and conducting a forward search have negative results.

3. The method according to claim 2, wherein said step of identifying the input frame as valid raw data further comprises the steps of:

determining whether a left over frame has been previously identified;

conducting a backward search of said plurality of frequency candidates when there is a previous frame left over;

identifying a pitch value from the backward search when such a value exists; and identifying the frame as non-valid when said backward search does not identify a valid pitch value.

4. The method according to claim 1, further comprising the step of normalizing the autocorrelation function with respect amplitude.

5. An apparatus for pitch extraction in speech recognition, synthesis and regeneration comprising:

input means for receiving a speech waveform;

processing means connected to said input means for receiving said speech waveform;

means for generating an autocorrelation function of the input speech waveform and extracting raw pitch values from frames of the autocorrelation function of said input speech waveform by using acoustic occurrences that occur both prior to and after a moment of pitch maintaining a running average of determined row pitch values means for estimating true pitch values by processing the raw pitch values using a weighted dynamic least squares process using a least squares fit to a cubic function.

6. The apparatus according to claim 5, wherein said input means is one selected from a group consisting of a microphone, a telephone, a recorded medium, and a broadcasted medium.

7. The apparatus according to claim 5, wherein said processing means, said generating means, said extracting means and said estimating means comprise a general purpose computer programmed to perform these functions.

8. A program storage device readable by a machine, tangibly embodying a program of instructions executable by the machine to perform method steps for extracting pitch from a speech signal, the method comprising the steps of:

performing autocorrelation of a digitized speech waveform to produce an autocorrelation function;

selecting at least three highest peaks from the autocorrelation function for each frame of the digitized waveform;

selecting a plurality of frequency candidates for each frame, the frequency candidates being three top-ranked frequencies calculated from the at least three highest peaks and at least the first and second harmonics of the at least three calculated top-ranked frequencies;

determining a raw pitch value for each frame using the plurality of frequency candidates and an energy value representing instantaneous voice energy;

maintaining a running average of determined raw pitch values;

identifying valid and non-valid frames of the input speech, wherein the valid frames have a determined raw pitch value and the non-valid frames do not have a determined raw pitch value;

assigning the running average of the determined raw pitch values as the raw pitch value for an identified non-valid frame; and performing a weighted dynamic least squares fit of the identified valid and non-valid frames to estimate the pitch value using a least squares fit to a cubic function.

9. The program storage device of claim 8, wherein the instructions for determining the raw pitch values further comprise instructions for:

evaluating current frame using a criterion of anchor points to determine if the current frame is an anchor point;

identifying the current frame as valid and assigning as the raw pitch value the frequency corresponding to the highest peak in the autocorrelation function, if the frame satisfies the anchor point criterion;

determining whether a previous frame of speech was identified as valid when the current frame is not identified as valid;

conducting a forward search using the frequency candidates of the current frame when the previous frame was identified as valid;

identifying the current frame as valid and assigning, based on the forward search, a raw pitch value as the frequency candidate that is within a specified distance to the raw pitch value of the previous frame; and identifying the current frame as a left over frame when said steps of determining whether a previous input frame was valid and conducting a forward search have negative results.

10. The program storage device of claim 9, wherein the instructions for determining the raw pitch values further comprise instructions for:

determining whether a left over frame has been previously identified;

conducting a backward search of said plurality of frequency candidates when there is a previous frame left over;

identifying a pitch value from the backward search when such a value exists; and identifying the frame as non-valid when said backward search does not identify a valid pitch value.

11. The program storage device of claim 8, further comprising instructions for normalizing the autocorrelation with respect amplitude.

* * * * *